United States Patent
Peterson et al.

(10) Patent No.: US 8,690,034 B2
(45) Date of Patent: Apr. 8, 2014

(54) ELASTIC SUSPENSION APPARATUS FOR BEVERAGES

(76) Inventors: Michele Antoinette Peterson, Redding, CA (US); Jody Rene Peterson, Redding, CA (US)

(*) Notice: Subject to any disclaimer, the term of this patent is extended or adjusted under 35 U.S.C. 154(b) by 1023 days.

(21) Appl. No.: 12/430,115

(22) Filed: Apr. 27, 2009

(65) Prior Publication Data

US 2009/0266859 A1 Oct. 29, 2009

Related U.S. Application Data

(60) Provisional application No. 61/125,891, filed on Apr. 28, 2008.

(51) Int. Cl.
*B60R 7/04* (2006.01)

(52) U.S. Cl.
USPC ............ 224/563; 224/926; 248/317; 248/322

(58) Field of Classification Search
USPC ................... 224/563, 275, 148.6, 148.7, 926; 248/318, 317, 322
See application file for complete search history.

(56) References Cited

U.S. PATENT DOCUMENTS

| | | | | |
|---|---|---|---|---|
| 951,684 | A | * | 3/1910 | Gillespie ............................ 47/67 |
| 3,014,759 | A | * | 12/1961 | Bing ......................... 297/188.06 |
| 3,986,649 | A | * | 10/1976 | Heimstra ....................... 224/567 |
| D242,674 | S | * | 12/1976 | Sweeney et al. ............... D6/513 |
| 4,032,102 | A | * | 6/1977 | Wolf et al. ..................... 248/318 |
| D256,412 | S | * | 8/1980 | Hovanec ......................... D6/514 |
| 4,337,916 | A | * | 7/1982 | Norris ............................ 248/558 |
| D265,611 | S | * | 8/1982 | Knudson ........................ D6/347 |
| 4,349,172 | A | * | 9/1982 | Banks, Jr. ...................... 248/318 |
| 4,601,453 | A | * | 7/1986 | Kagan ............................ 248/329 |
| 4,630,795 | A | * | 12/1986 | Kagan ............................ 248/318 |
| 4,669,691 | A | * | 6/1987 | Solomon ........................ 248/165 |
| 4,669,693 | A | * | 6/1987 | Kagan ............................ 248/318 |
| 5,046,433 | A | * | 9/1991 | Kramer et al. .................. 108/44 |
| 5,226,576 | A | * | 7/1993 | Ellsworth ....................... 224/572 |
| 5,326,175 | A | * | 7/1994 | Carter ............................. 383/22 |
| 5,356,061 | A | * | 10/1994 | Yu ................................. 224/275 |
| 5,362,153 | A | * | 11/1994 | Lu ................................... 383/38 |
| 5,454,497 | A | * | 10/1995 | Kettelson ................... 224/148.6 |
| 5,511,754 | A | * | 4/1996 | Johannsen ................. 248/311.2 |
| 6,092,705 | A | * | 7/2000 | Meritt ............................ 224/275 |
| 6,098,860 | A | * | 8/2000 | Phillips ......................... 224/483 |
| 6,105,839 | A | * | 8/2000 | Bell .............................. 224/275 |

(Continued)

FOREIGN PATENT DOCUMENTS

| | | | | | |
|---|---|---|---|---|---|
| CA | 1106158 | | * | 8/1981 | ............. F16G 11/00 |
| CA | 1106158 | A | * | 8/1981 | ............. F16G 11/00 |

*Primary Examiner* — Justin Larson
*Assistant Examiner* — Lester L Vanterpool
(74) *Attorney, Agent, or Firm* — William Bodnar

(57) ABSTRACT

The Elastic Suspension Apparatus for Beverages is an elasticized drink holder for use in vehicles. The apparatus expands in width as well as depth to accommodate many sizes of drink containers including 44 oz. and 64 oz. The elasticity of the Elastic Suspension Apparatus for Beverages also allows the drink container to move with the motion of the vehicle, reducing spills and toppling.
The ESAB has an uppermost suspense/mounting portion that would be mounted in the upper portion of the vehicle, a lowermost anchor/mounting portion that would be mounted in the lower portion of the vehicle, a main body portion to hold a drink container, and an object with a vacant center that can be adjusted to help stabilize a drink container within the main body portion.

1 Claim, 3 Drawing Sheets

(56) References Cited

U.S. PATENT DOCUMENTS

| | | | |
|---|---|---|---|
| 6,216,927 B1 * | 4/2001 | Meritt | 224/275 |
| 6,237,267 B1 * | 5/2001 | Lackomar | 40/593 |
| 6,405,909 B1 * | 6/2002 | Burnett et al. | 224/275 |
| 6,540,189 B2 * | 4/2003 | Hsiang | 248/318 |
| 7,032,347 B2 * | 4/2006 | Hartman | 47/67 |
| 7,533,860 B2 * | 5/2009 | Somuah | 248/311.2 |
| 7,726,072 B1 * | 6/2010 | Kuslaka et al. | 47/67 |
| 2007/0108239 A1 * | 5/2007 | San Nicholas | 224/148.6 |

* cited by examiner

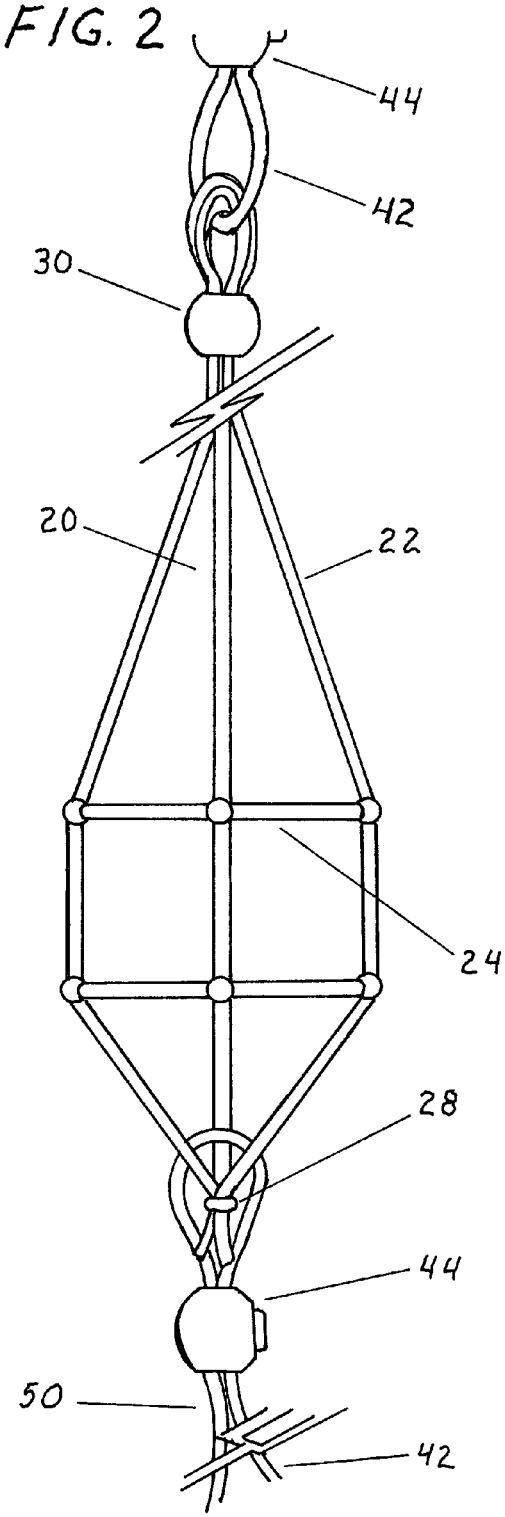
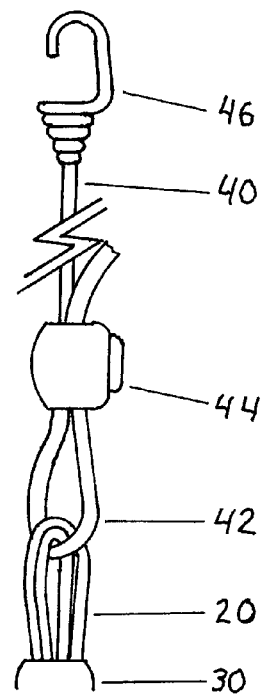
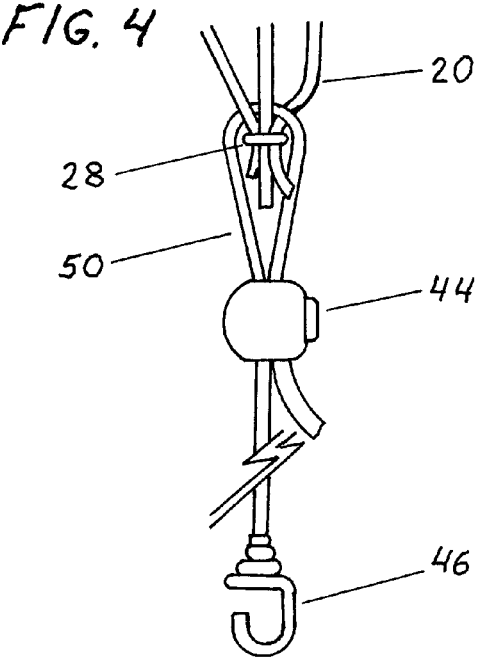

ELASTIC SUSPENSION APPARATUS FOR BEVERAGES

CROSS REFERENCE TO RELATED APPLICATION

We hereby claim benefit under Title 35, United States Code, Section 120 of U.S. patent application Ser. No. 61/125,891 filed Apr. 28, 2008 (hereinafter "Prior Application"). This application is a continuation of the Prior Application. The Prior Application is hereby incorporated by reference into this application.

BACKGROUND OF THE INVENTION

1. Field of Invention

This invention relates to tools commonly used by consumers of beverage products. More specifically, this invention relates to the various types of drink holders consumers have available for use in their vehicles such as, but not limited to, standard vehicle manufacturer drink holders or drink holder accessories purchased in commerce.

2. Description of Related Art

Any discussion of the prior art throughout the specification should in no way be considered as an admission that such prior art is widely known or form part of general knowledge in the field.

Drink holders are commonly used in a variety of vehicles. Many vehicle manufacturers include drink holders as part of standard equipment. As there are different styles and sizes of drink containers, so are there different sizes and styles of drink holders available in commerce. Fast food restaurants, coffee houses, convenience stores, and super markets have a variety of different drink containers available. At times various consumers must decide to use, or not use, the available drink holder (if one exists) as in the case when the drink holder is not large enough to accommodate a particular size drink container. Sometimes, even with adequate circumference to fit a large drink in the holder, a large drink may topple out of the holder due to an inadequate depth of the holder. Typical methodologies of transporting a large size drink container without the use of a holder is to: 1) Place the drink on the floorboard of the vehicle. 2) Seatbelt the drink into the passenger seat. 3) Hold the drink between the inner-thighs of the driver. 4) Hold the drink in one hand while steering the vehicle with the other hand. All of these methods are obviously unsafe to the drivers, passengers, and all other vehicles on the roadways.

Whatever method is used, the inability to safely transport a beverage significantly increases the chances of beverage spills and even vehicle accidents. Many professions require drivers to man their vehicles for many hours of the day. This leaves a driver to possibly go without refreshment. A means of accommodating any size drink, with a one size fits most, if not all, approach would be valuable to consumers of beverages especially drivers.

BRIEF SUMMARY OF THE INVENTION

The Elastic Suspension Apparatus for Beverages, hereinafter referred to as ESAB, of the present invention overcomes the problems associated with prior art. It is for use in vehicles of practically any size, type, make, or model. The ESAB can expand horizontally and vertically to accommodate many different sized drink containers including, but not limited to, 44 oz and 64 oz due to its elasticity which forms itself around the drink container for a secure fit.

The EASB absorbs shocks and vibrations from the vehicle by allowing the chink to move with the motion of the vehicle, thus reducing spills as opposed to stationary drink holders that transfer the vibrations of the vehicle into the beverage. The ESAB also eliminates toppling of top heavy drinks because the drink is held deeply and securely in the main body portion of the ESAB.

BRIEF DESCRIPTION OF THE DRAWINGS

FIG. 2 is a side perspective view of the main body portion of the present invention.

FIG. 3 is a side perspective view of the uppermost suspense/mounting portion.

FIG. 4 is a side perspective view of the lowermost anchor/mounting portion.

DETAILED DESCRIPTION OF THE INVENTION

Figure 1:
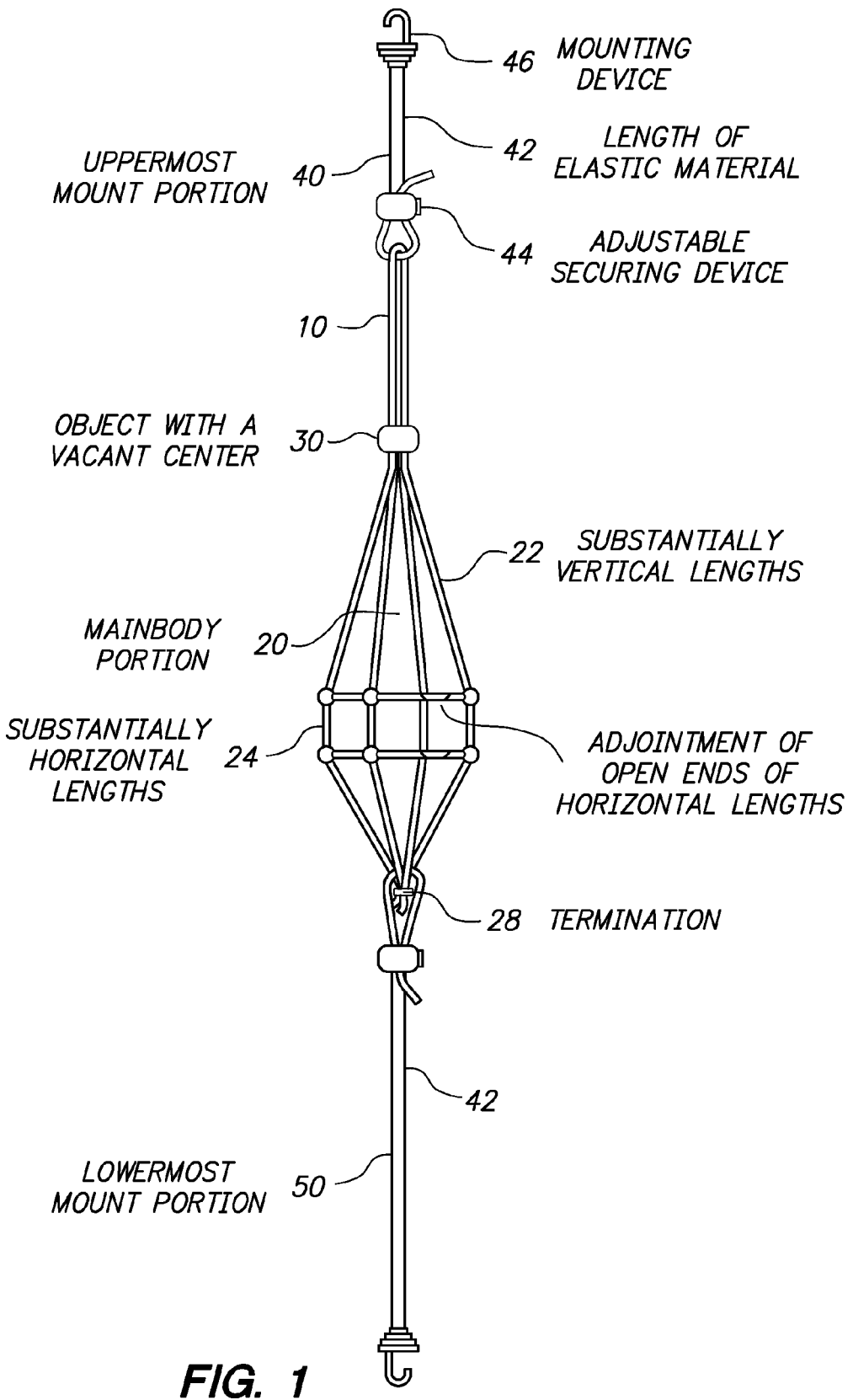
FIG. 1 is a side perspective view of the present invention illustrating the components that make up the preferred embodiments.

In FIG. 1, ESAB 10 has a main body portion 20, an object with a vacant center 30, an uppermost suspense/mounting portion 40, and a lowermost anchoring/mounting portion 50, with each portion attached to the main body portion 20.

In FIG. 1, a plurality of substantially vertical lengths of elastic material 22 and substantially horizontal lengths of elastic material 24 arc arranged to form a substantially, cylindrical shaped cup receiving main body portion. The intersections of substantially vertical lengths of elastic material 22 and the substantially horizontal lengths are secured by any means. This may include, but not limited to the use of studs, sewing, gluing, melting, and so on.

Figure 5:
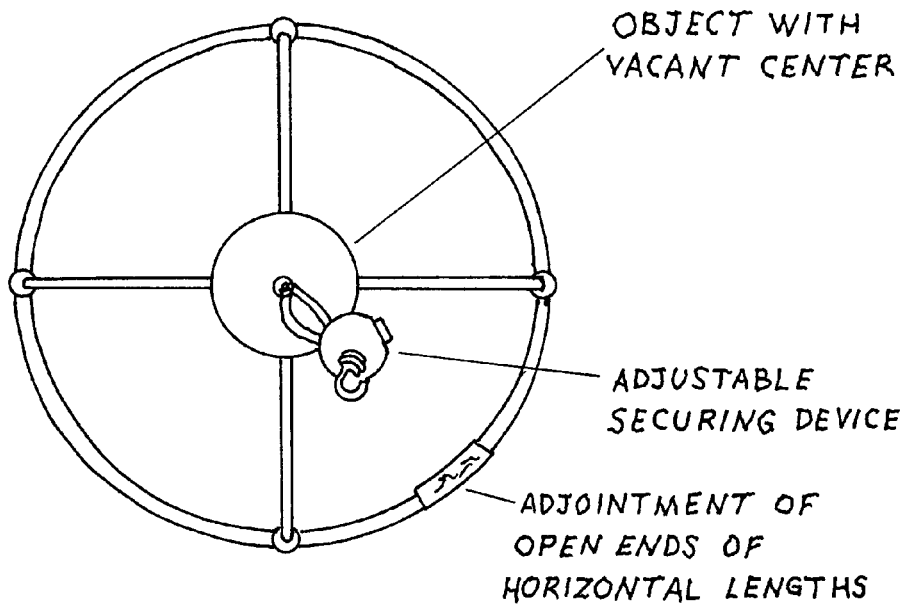
FIG. 5 is a top perspective view of the present invention illustrating the substantially cylindrical shaped cup receiving main body portion.
Figure 6:
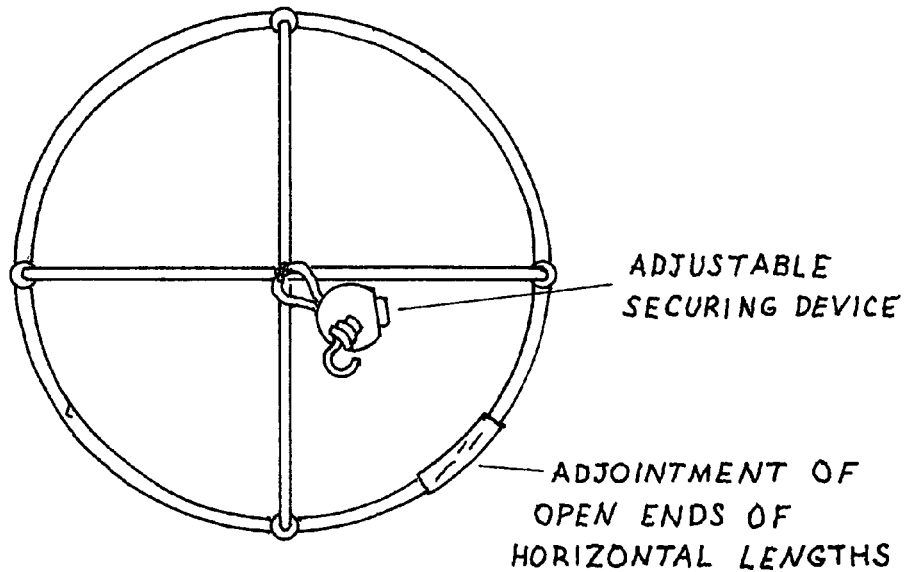
FIG. 6 is a bottom perspective view of the present invention.

In FIG. 5, the open furthermost ends of the substantially horizontal lengths of elastic material 24 are butted permanently together to form a substantially cylindrical shaped cup receiving maul body portion. In FIG. 1, the plurality of the furthermost ends of the substantially vertical lengths of elastic material 22 is terminated within one termination 28. The uppermost portion of the main body portion 20, is threaded through an object with a vacant center 30, which serves as a stabilization device.

In FIG. 3, the uppermost suspense/mounting portion 40 is threaded through the uppermost portion of the main body portion 20 and secured to the main body portion by means of an adjustable securing device 44. In FIG. 1, the mounting devices 46 are attached at the furthermost ends of the uppermost suspense/mounting portion 40 and the lowermost anchor/mounting portion 50 by means applicable to the mounting device 46.

Method of Use:

In FIG. 1, a suitable location for ESAB 10 inside the vehicle must be chosen. The uppermost suspense/mounting portion 40 is mounted in the upper portion inside the vehicle by means of the mounting device 46. The lowermost anchor/mounting portion 50 is mounted in the lower portion of the inside of the vehicle by means of the mounting device 46. The height of the ESAB 10 is adjusted using the adjustable securing devices 44 by means applicable to the securing devices 44. Place desired beverage container in the main body portion 20. Adjust the object with a vacant center 30 by sliding it downward towards the beverage container to desired level which best secures the beverage container within the main body portion 20.

Variations:

In FIG. 1, the ESAB 10, as disclosed herein, is easily adapted to any number of manufacturing styles and designs such as, but not limited to, the specific process of manufacture (such as illustrated in FIG. 1), but may include processes such as, but not limited to, weaves, stitches, and any number of styles and materials used by various manufacturers.

The spirit of the present invention provides a breadth of scope that includes all methods in manufacturing designs. Any variations of the theme and the methodology of accomplishing the same that are not described herein would be considered under the scope of the present invention.

We claim:

1. An Elastic Suspension Apparatus for Beverages for suspending and anchoring a beverage container within a cabin of a vehicle; wherein said apparatus is secured within a vehicle cabin by a mounting device at both uppermost and lowermost ends of said apparatus; wherein said uppermost mounting device is secured within the uppermost area of a cabin of a vehicle and said lowermost mounting device is secured within the lowermost area of a cabin of a vehicle; wherein said apparatus has an elastic substantially cylindrical shaped cup receiving main body portion; said main body portion has upward elongated parallel extended lengths; wherein a beverage container is placed in said cup receiving main body portion; an object with a vacant center is raised or lowered along said upward elongated parallel extended lengths to help stabilize said beverage container within the said main body portion; said apparatus also having an elastic uppermost suspense/mounting portion and an elastic lowermost anchoring/mounting portion; said portions each having an adjustable securing device for applying or releasing tension and attaching said uppermost and lowermost portions to the main body portion of said apparatus comprising:

said object with said vacant center;

said elastic substantially cylindrical shaped cup receiving main body portion partially threaded through said object with said vacant center;

said elastic uppermost suspense/mounting portion attached to said uppermost portion of said main body portion via said uppermost adjustable securing device above the object with said vacant center; and said elastic lowermost anchoring/mounting portion attached to said lowermost portion of said main body portion;

said uppermost suspense/mounting portion having said uppermost adjustable securing device and said uppermost suspense/mounting device of any means and said lowermost anchoring/mounting portion having said lowermost adjustable securing device and said lowermost anchoring/mounting device of any means.

* * * * *